US006805768B2

(12) United States Patent
Agarwal et al.

(10) Patent No.: US 6,805,768 B2
(45) Date of Patent: Oct. 19, 2004

(54) METHOD OF FORMING RUBBER-METAL COMPOSITES

(75) Inventors: Rajat K. Agarwal, Rochester Hills, MI (US); William E. Fristad, Rochester Hills, MI (US); Gregg W. Rossier, Martinsville, IN (US); Roman M. Skikun, Novi, MI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/788,707

(22) Filed: Feb. 20, 2001

(65) Prior Publication Data

US 2002/0011309 A1 Jan. 31, 2002

Related U.S. Application Data

(60) Provisional application No. 60/183,604, filed on Feb. 18, 2000.

(51) Int. Cl.⁷ .......................... B32B 31/06; B32B 31/12
(52) U.S. Cl. .................. 156/307.5; 156/330; 427/409; 427/410; 523/402
(58) Field of Search ............................. 156/330, 307.5; 523/402; 427/409, 410

(56) References Cited

U.S. PATENT DOCUMENTS

| | | | | |
|---|---|---|---|---|
| 2,706,166 A | * | 4/1955 | Gurney | 156/315 |
| 3,042,545 A | * | 7/1962 | Kienle et al. | 156/330 |
| 3,063,877 A | | 11/1962 | Schiffman | |
| 3,258,388 A | * | 6/1966 | Coleman et al. | 156/307.5 |
| 3,585,084 A | | 6/1971 | Steinbrecher et al. | |
| 3,592,699 A | | 7/1971 | Steinbrecher et al. | |
| 3,647,567 A | | 3/1972 | Schweri | |
| 3,791,431 A | | 2/1974 | Steinbrecher et al. | |
| 3,795,546 A | | 3/1974 | Hall et al. | |
| 4,030,945 A | | 6/1977 | Hall et al. | |
| 4,180,603 A | | 12/1979 | Howell, Jr. | |
| 4,186,226 A | | 1/1980 | Smith | |
| 4,233,147 A | | 11/1980 | Giacopelli et al. | |
| 4,289,826 A | | 9/1981 | Howell, Jr. | |
| 4,636,264 A | | 1/1987 | Schellenberg et al. | |
| 4,636,265 A | | 1/1987 | Fischer et al. | |
| 4,800,106 A | | 1/1989 | Broadbent | |
| 5,393,416 A | * | 2/1995 | Kozak et al. | |
| 5,500,460 A | * | 3/1996 | Ahmed et al. | 523/402 |
| 6,096,806 A | | 8/2000 | Mueller et al. | |
| 6,211,283 B1 | * | 4/2001 | Honda et al. | 524/501 |
| 6,379,752 B1 | * | 4/2002 | Schelbach et al. | |
| 6,428,645 B1 | * | 8/2002 | Rau | 156/307.5 X |
| 6,476,119 B1 | * | 11/2002 | Kucera et al. | |

FOREIGN PATENT DOCUMENTS

| | | | |
|---|---|---|---|
| DE | 197 55 421 A1 | * 6/1999 | |
| JP | 135052 | 10/1981 | |
| JP | 56-135052 | * 10/1981 | 156/330 |
| WO | WO-97/07163 A1 | * 2/1997 | |
| WO | WO9 937712 | 1/1999 | |
| WO | WO9 930841 | 6/1999 | |
| WO | WO9 937713 | 7/1999 | |
| WO | WO9 937722 | 7/1999 | |
| WO | WO0 071337 | 11/2000 | |

OTHER PUBLICATIONS

Encyclopedia of Polymer Science and Engineering, vol. 6, 2nd edition, "Epoxy Resins", pp. 322–382.

* cited by examiner

Primary Examiner—Adrienne C. Johnstone
(74) Attorney, Agent, or Firm—Stephen D. Harper; Mary K. Cameron

(57) ABSTRACT

A film of a polymer or polymer precursor such as an epoxy resin is autodeposited on an active metal surface and then used to form an adhesive bond directly between the metal surface and the surface of a rubber substrate. Excellent adhesion of the metal to the rubber is obtained without the need to either phosphate the metal surface or use a primer or adhesive other than the autodeposited coating.

18 Claims, No Drawings

METHOD OF FORMING RUBBER-METAL COMPOSITES

This application claims priority from U.S. provisional application Ser. No. 60/183,604, filed Feb. 18, 2000, incorporated herein by reference in its entirety.

FIELD OF THE INVENTION

This invention pertains to rubber-metal composites formed by applying a layer of an autodeposited coating on a metal surface and then directly bonding rubber to the coated metal surface. The use of a separate adhesive or binder layer is not required.

BACKGROUND OF THE INVENTION

Rubber-metal composites are widely used in the manufacture of anti-vibration (AV) and noise and vibration handling (NVH) components. Such components are most commonly used as engine mounts in vehicles and as oil seals for rail cars. Typically, the rubber used is natural rubber (NR) for AV and NVH components and nitrile rubber (NR) for applications where resistance to oil and grease is required. Traditionally, the rubber is bonded to a preformed metal substrate which has first been phosphated. Phosphating of the metal is critical since it protects the metal surface from corrosion and prepares it for bonding to the rubber. However, phosphate pretreatment has the disadvantage of generating large volumes of effluent waste which must be treated prior to disposal. Elimination of the phosphating step thus would be desirable, although some alternative method of imparting corrosion resistance to the metal surface must still be used. Rubber-metal composites, particularly those utilized in automotive applications, are exposed to substances containing corrosive salts or the like that may attack any metal surface not covered by the rubber and/or the bond between the metal and rubber components.

The phosphated metal surface is then commonly bonded to the rubber using two coats of adhesive (a primer coat and a top coat). The primer coat bonds primarily to the phosphated metal, while the top coat bonds to the rubber. Most of the adhesive used currently in the industry for this purpose are solvent-based and have a high content of VOCs (volatile organic compounds). Commonly used solvents are toluene, xylene, and methyl isobutyl ketone (MIBK).

The use of autodeposition coatings in rubber-metal composites is described in WO 99/30841 and WO 99/37713. Such coatings provide good corrosion protection to metal substrates, thereby permitting the phosphate pretreatment step to be eliminated. However, to date such coatings have always been used in combination with one or more layers of an adhesive or binder.

SUMMARY OF INVENTION

This invention provides a method for bonding an elastomeric substrate surface to a metallic substrate surface comprising autodepositing a coating onto the metallic substrate surface, contacting the elastomeric substrate surface with the coating on the metallic substrate surface, and forming a bond between the elastomeric substrate surface and the metallic substrate surface. Application of a separate adhesive layer or separate primer layer to the autodeposited coating prior to bonding thus is not necessary.

This process is simpler and more economical to operate than conventional methods of bonding rubber to metal, yet provides a rubber-metal composite with excellent adhesion between the rubber and metal components. The process has the further advantage of not requiring the use of an organic solvent-containing adhesive, thereby lessening environmental problems. If the autodeposited coating is pigmented, the rubber-metal composite need not be painted with a final top coat after assembly since the appearance of the autodeposited coating is adequate for most industry requirements.

DETAILED DESCRIPTION OF THE INVENTION

Metals which are suitable as the metal substrate are those whose ions bring about coagulation and deposition of the autodepositing resin. Such metals include in particular cast iron, steel and other iron-containing substrates. However, the process may also be carried out on zinc or galvanized steel if an autodepositing resin is selected which is suitable for this purpose or if suitable pre-rinses or pre-treatments are employed. In one embodiment of the invention, the surface of the metal substrate is not phosphatized prior to formation of the autodeposition coating.

Without wishing to be bound by theory, the principle of autodeposition is believed to be as follows: an acid aqueous emulsion of an organic polymer (or polymer precursor is such as an epoxy resin) is prepared. When a metal surface is brought into contact with such an emulsion, the acid acts to dissolve metal ions out of the surface. The metal ions bond with the polymer/polymer precursor particles and bring about coagulation of the latter. As this process takes place directly on the metal surface, the coagulated polymer/polymer precursor is deposited as a coating on the metal surface. When the metal surface is covered completely with polymer/polymer precursor, the process comes to a halt. The layer thicknesses obtained in this process are generally within the range of from about 15 to about 30 Fm. When coating is concluded, the metal parts are removed from the treatment bath, and excess emulsion is rinsed off with water. A reactive post-rinse frequently follows, which improves both the adhesion of the autodeposition coating to the metal and also the corrosion protection.

The autodeposition resins which can be employed in the present bonding process are those resins which are capable of withstanding the elevated temperatures which may be encountered during the bonding step wherein the rubber is bonded to the film of autodeposited resin. Where the rubber is thermosettable, for example, the autodeposition resin must not decompose at the temperatures required to cure the rubber. Additionally, it will generally be desirable to utilize autodeposition resins containing functional groups capable of chemically reacting with functional groups present in the rubber. Adhesion promoters such as chlorinated rubbers and chlorinated polyolefins may also be blended with the autodeposition resin to enhance bond strength between the rubber and metal.

Autodeposition resins are described in detail in the following U.S. Pat. Nos., among others: 3,063,877; 3,585,084; 3,592,699; 3,647,567; 3,791,431; 4,030,945; 4,186,226; 3,795,546; 4,636,265; 4,636,264 and 4,800,106, each of which is incorporated herein by reference in its entirety.

Epoxy resin-based autodeposition coating systems are especially preferred for use in the present invention. Such systems are well-known in the art and are described, for example, in U.S. Pat. Nos. 4,233,147; 4,180,603; 4,289,826; and 5,500,460 and 6,096,806, the teachings of each of which are incorporated herein by reference in their entirety. Epoxy resins are well known substances and are described, for example, in the chapter entitled "Epoxy Resins" in Volume 6 of *The Encyclopedia of Polymer Science and Engineering* (Second Edition). Preferably, at least one of the epoxy resins is a glycidyl ether of a polyhydric phenol. Such epoxy resins preferably contain approximately two epoxide groups per molecule. The polyhydric phenol may be any compound containing one or more aromatic rings and two or more hydroxy groups such as bisphenol A (a particularly preferred species of polyhydric phenol), bisphenol F, bisphenol AD, catechol, resorcinol, and the like. It will generally be desirable to utilize epoxy resins of the type which have relatively low epoxide equivalent molecular weights (e.g., about 75 to about 300) and/or which are liquid at ambient temperatures.

The epoxy-based autodeposition coating systems described in WO 00/171337 (relying for priority on U.S. Ser. No. 60/146001, filed May 26, 1999), incorporated herein by reference in its entirety, are especially well suited for use in the present invention. In one particularly desirable embodiment, at least one diglycidyl ether of bisphenol A having an epoxide equivalent weight of about 150 to about 300 is used in combination with at least one flexibilizing epoxy resin. The use of a flexibilizing epoxy resin has been found to reduce the extent of crazing observed in the coating under low humidity coating conditions. Suitable flexibilizing epoxy resins include those compounds containing at least one epoxide group per molecule and one or more groups capable of increasing the flexibility of the autodeposited resin such as, for example, long aliphatic chains (e.g., polymethylene chains corresponding, for example, to the structure —$(CH_2)_n$— wherein n is preferably >3, more preferably, >6; the polymethylene chains can be in the backbone of the flexibilizing epoxy resin and/or can be pendent thereto), polyester chains (especially those formed by condensation of aliphatic diacids and glycols or glycol oligomers), polyoxyalkylene chains (e.g., polyether chains corresponding to the structure —$((CH_2)_n$—CHR—O—$)_m$—, where n is 0–3, m is 2 or greater, and R is H or alkyl), and the like. A particularly preferred flexibilizing epoxy resin is a difunctional epoxy derived from cardanol (a phenol substituted with a long chain unsaturated hydrocarbon group which is obtained from cashew nut oil) having an epoxy equivalent weight of about 350; such a material is available from the Cardolite Corporation of Newark, New Jersey, under the trademark CARDOLITE NC-514. CARDOLITE NC-513, which is believed to be expoxidized cardanol having a single epoxy group per molecule, and CARDOLITE NC-551 have also been found to be useful in the present invention. The relative ratio of bisphenol A diglycidyl ether to flexibilizing epoxy resin can be varied considerably depending upon the individual components selected and the properties desired in the final autodeposition coating. Typically, however, it will be desirable to use less flexibilizing epoxy resin than bisphenol A diglycidyl ether on an equivalents basis. For example, the ratio of flexibilizing epoxy resin:bisphenol A diglycidyl ether may suitably be from about 0.05 to about 0.40 (as calculated from the epoxide equivalent weight of each component). Typically, the flexibilizing segments will comprise from about 1 to about 25% by weight of the epoxy resin(s) and other reactive components (such as the chain extenders discussed in more detail below).

Other methods of introducing flexibilizing segments such as polymethylene or polyoxyalkylene into the resin to be autodeposited may also be employed. For example, the chain extender discussed in more detail below may contain such moieties, either in the backbone of the chain extender or pendent thereto. Alternatively, some or all of the epoxy groups of the resin could be reacted with a compound containing one or more flexibilizing segments (e.g., a long chain fatty acid such as pelargonic acid or a monoether of an aliphatic polyether diol). The hydroxy groups of the resin could also be derivatized with compounds containing flexibilizing segments (for example, the hydroxy groups could be esterified with a long chain fatty acid).

A chain extender may be utilized to react individual epoxy resin molecules through their epoxy groups so as to form a polymer which is higher in average molecular weight than the starting epoxy resin(s). In one embodiment of the invention, the average molecular weight is increased at least 100%, more preferably at least about 200%, relative to the initial average molecular weight of the starting epoxy resin or combination of epoxy resins. The chain extender thus should contain at least two functional groups capable of reacting with said epoxy group such as, for example, hydroxy, carboxylic acid, carboxylic acid anhydride or the like. In one embodiment of the invention, the chain extender is a polyhydric phenol such as bisphenol A. Alkoxylated polyhydric phenols such as SYNFAC 8009 (available from Milliken Chemical) may also be used as chain extenders. Suitable chain extenders additionally include dicarboxylic acids such as adipic acid.

In one embodiment of the invention a diglycidyl ether of a polyhydric phenol such as bisphenol A is used in combination with a chain extender which contains one or more flexibilizing segments such as polymethylene, polyester or polyoxyalkylene segments. For example, a polyether polyol such as polypropylene glycol, polyester polyol (hydroxy and/or carboxylic acid terminated), dimer fatty acid, long chain dicarboxylic acid (e.g., decanedioic acid), long chain diol (e.g., 1, 12-decanediol), or the like could be used.

The stoichiometry of chain extender(s) to epoxy resin(s) is adjusted depending upon the degree of condensation (i.e., chain extension) desired in forming the polymer which is to be used as the autodeposition resin. Typically, however, the amount of epoxy resin(s) is kept in slight to moderate excess relative to the amount of chain extender(s). For example, the equivalents of epoxy groups in the epoxy resin(s) may be about 5% to about 50% greater than the equivalents of active hydrogen groups in the chain extender(s). The polymer formed thus will contain unreacted epoxy groups (i.e., the polymer will be epoxy-functionalized). Typically, the polymer will also contain hydroxy (—OH) groups, which may be present in the initial epoxy resin(s) or which may be formed as a consequence of the reaction between the chain extender and the epoxy groups of the epoxy resin.

The epoxy resin(s) and chain extender(s) are reacted for a time and at a temperature effective to cause the desired degree of condensation and chain extension. In one embodiment of the invention, for example, the epoxide equivalent weight of the polymer formed will be in the range of at least about 1000, preferably at least about 1500, as compared to epoxide equivalent weights for the starting epoxy resin reactant(s) of from about 75 to about 500. Such conditions will vary depending upon the relative reactivity of the components and other factors, but may be optimized without undue experimentation. Catalysts capable of accelerating the desired epoxy group reaction with the chain extender such as phosphines, amines and other basic substances may be utilized if so desired in order to reduce the reaction time and/or temperature required. The reaction may be carried out in the presence of a solvent capable of dissolving both the epoxy resin(s) and the chain extender(s) such as, for example, an inert organic solvent (e.g., aromatic hydrocarbons, ketones).

In one desirable embodiment of the invention, the polymer derived from the epoxy resin(s) and chain extender(s) is prepared prior to forming an emulsion of said polymer in water. A solution of the polymer in one or more organic solvents is emulsified with water in the presence of one or more emulsifiers to form an organic solvent-containing intermediate emulsion. The organic solvent(s) used in said emulsification step may be the same as or different from the organic solvent(s) used when reacting the epoxy resin(s) and chain extender(s). Other desired components such as cross-linkers, coalescing agents, flow control additives (leveling agents), and the like may also be incorporated into the emulsion, either as components predissolved in the organic (solvent) phase or added separately to the emulsion.

Suitable cross-linkers include molecules containing at least two functional groups such as amine, amide, imine, thiol, hydroxyl, carboxyl, and carboxylic acid anhydride that are capable of chemical addition reactions with the epoxy groups present in the polymer when heated to a temperature of at least 100° C. as well as molecules containing at least two blocked isocyanate groups. Each such isocyanate group is masked with a blocking group such as ketoxime, urea (formed using an alcohol or phenol), uretdione, or group derived from the lactam of 6-aminohexanoic acid and/or benzotriazole, so that the blocked isocyanate group does not react at any appreciable rate at room temperature with hydroxyl groups but does react rapidly with such groups after being unblocked by heating to a temperature of at least about 100° C. Suitable cross-linkers of these types are described, for example, in U.S. Pat. Nos. 5,500,460 and 6,096,806. The use of isophorone diisocyanate-based, epsilon-caprolactam blocked isocyanates as cross-linkers, such as the product sold by Huels under the trademark VESTAGON B1530, is particularly preferred. If a blocked isocyanate-type cross-linker is utilized, the molar ratio of blocked isocyanate groups to hydroxy groups (NCO:OH) typically will be in the range of about 0.05 to about 1.2, more preferably about 0.1 to about 0.5.

Generally, the presence of one or more coalescing agents in the autodeposition bath composition will be desirable in order to optimize the properties of the cured coatings obtained therefrom. Coalescing agents, for example, help to minimize the blistering problems sometimes exhibited by autodeposited coatings. At the same time, however, it will generally be desirable for environmental and economic reasons to limit the amount of coalescing agent utilized. In certain embodiments of the invention, it is possible to omit coalescing agent(s) altogether and yet still obtain autodeposited coatings meeting all minimum criteria for commercial acceptance. The coalescing agent(s) are preferably selected from the group consisting of monoethers and monoesters of glycols. The glycols may be monomeric or oligomeric in structure. Illustrative coalescing agents include, but are not limited to, propylene glycol mono-n-butyl ether, propylene glycol monophenol ether, and 2,2,4-trimethyl-1,3-pentanediol mono 2-methyl propionate.

The emulsifier(s) used may be any of the substances capable of stabilizing the emulsion of the autodeposition resin in water and preferably are anionic surfactants such as sulfonates and sulfates. Preferred anionic surfactants are ether sulfates corresponding to the general formula M—O—$SO_2$—O—$(CH_2$—$CH_2$—$O)_p$—R where M is a monovalent cation or monovalent fraction of a cation of higher valence, preferably sodium or ammonium, p is a positive integer (preferably; equal to 2 or more), and R is an alkyl or alkyl aryl moiety (preferably, an alkyl phenol moiety), preferably containing at least 8 but not more than 30 carbon atoms. The polymer is regarded as stably emulsified if no separation or segregation of the polymer phase that is perceptible with normal unaided human vision occurs during storage at 25 degrees C. for at least 24 hours after preparation of the emulsion.

Suitable flow control additives or leveling agents include, for example, the acrylic (polyacrylate) substances known in the coatings art such as the products sold under the trademark MODAFLOW by Monsanto, as well as other leveling agents such as BYK-310 (BYK-Chemie), PERENOL F-60 (Henkel), and FLUORAD FC-430 (3M).

Emulsification may be accomplished by any of the emulsification procedures known in the art. For example, the procedures described in U.S. Pat. No. 6,096,806 are followed. These procedures involve a two stage process in which a solution of the epoxy resin(s) or polymers derived therefrom in a suitable solvent such as an aromatic hydrocarbon (especially those containing 6 to 10 carbon atoms such as toluene) and/or an aliphatic ketone (especially those containing 3 to 8 carbon atoms such as methyl isobutyl ketone) is emulsified into water to form a preliminary dispersion and the preliminary dispersion is subjected to at least one particle size refinement stage in which the preliminary dispersion is forced through a narrow aperture.

Following emulsification, it will generally be desirable to remove any organic solvent(s) present by an appropriate means such as, for example, distillation. Where the epoxy resin or polymer derived therefrom is a solid at 25 degrees C., solvent removal will normally result in the formation of a dispersion (i.e., solid particles of epoxy resin or derivative polymer dispersed in water). The temperature during distillation should be controlled in order to avoid premature curing or cross-linking of the epoxy resin or derivative polymer by the cross-linker. The distillation may be conducted under reduced pressure if the normal boiling point of the solvent to be removed is higher than the desired distillation temperature. The solvent removal conditions are also preferably selected such that the organic solvent(s), but not the coalescing agent(s), are separated from the emulsion. For the reason, it will be desirable to use a solvent which has a boiling point (or an azeotropic boiling point with water) which is lower than the boiling point(s) of the coalescing agent(s). Alternatively, the organic solvent component of the emulsion may be left in when the emulsion is used in the autodeposition coating; any solvent remaining in the wet coating may be removed during the curing step.

The aqueous compositions comprising phenolic resin and/or phenolic novolak resin described in WO 99/37713 (corresponding to U.S. Ser. No. 60/072,779, filed Jan. 27, 1998), WO 99/37722 (corresponding to U.S. Ser. No. 60/072,782, filed Jan. 27, 1998), and WO 99/37712 (corresponding to U.S. Ser. No. 60/072,887, filed Jan. 27, 1998) are also believed to be suitable for use in forming the autodeposited coating component of the present invention. The foregoing applications and any U.S. patent granted thereon are hereby incorporated by reference in their entirety.

To prepare a bath composition suitable for coating a metallic substrate by autodeposition, an aqueous emulsion or dispersion of one or more of the aforementioned resins is combined with an accelerator such as acid, oxidizing agent, and/or complexing agent which is capable of causing the dissolution of active metals (e.g., iron) from the surface of the metallic substrate in contact with the bath composition. Preferably, the amount of accelerator present is sufficient to dissolve at least about 0.020 gram equivalent weight of metal ions per hour per square decimeter of contacted surface at a temperature of 20° C. Preferably, the accelerator (s) are utilized in a concentration effective to impart to the bath composition an oxidation-reduction potential that is at least 100 millivolts more oxidizing than a standard hydrogen electrode. Such accelerators are well known in the autodeposition coating field and include, for example, hydrofluoric acid and its salts, fluorosilicic acid and its salts, fluorotitanic acid and its salts, salts comprising ferric ions, acetic acid, phosphoric acid, sulfuric acid, nitric acid, hydrogen peroxide, peroxy acids, citric acid and its salts, and tartaric acid and its salts. The pH of the bath composition preferably is in the range of from about 2 to about 4.

The autodeposition bath composition may additionally contain, if desired, pigment, filler, or other dispersed solid phase materials, dyes or other dissolved colorants, plasticizers as well as other of the components conventionally used in the autodeposition coating field. The relative proportions and concentrations of the various components of the autodeposition bath composition may be, for example, the same as those set forth in U.S. Pat. No. 6,096,806.

To coat the metallic substrate to be bonded to the elastomeric substrate, an object with an active metal surface is contacted with the aforedescribed autodeposition bath composition for a sufficient time to cause the formation of a film of the autodeposition resin of a pre-determined thickness on the metal surface, separating the coated metal surface from contact with the autodeposition bath composition, and rinsing the coated metal surface to remove at least some of the absorbed but otherwise unadhered components of the bath composition from the more adherent portion of the coating. Preferably, contact between an active metal surface and the autodeposition bath composition is for a time between about 0.5 and about 10 minutes, more preferably between about 1 and 3 minutes. Contact preferably is long enough to produce a final film thickness of from about 15 to about 50 microns.

Optionally, a reagent capable of causing additional desirable reactions in the coated film may be included in the rinse used after cessation of contact between the wet coated surface and the bulk of the autodeposition bath composition. Such a reagent may also be brought into contact with the wet coated film after rinsing with water alone. Suitable reactive post-rinse methods are described, for example, in U.S. Pat. No. 6,410,092, and in U.S. Pat. No. 6,613,387, each of which is incorporated herein by reference in its entirety.

The rinsed wet-coated and optionally post-treated film of autodeposition resin which has been deposited on the metallic substrate is then heated to dry the resin film. If components of the film are reactive (such as in the embodiment where the autodeposition composition is epoxy-based), heating will also typically achieve curing (e.g., cross-linking) of the autodeposited coating. Heating is preferably performed at a temperature of from about 100° C. to about 300° C., more preferably between about 130° C. and 200° C., for a time of from about 3 to about 60 minutes.

The autodeposition-coated metallic substrate is then placed in direct contact with a surface of the rubber (or rubber precursor) to be bonded thereto and heated to create an adhesive bond between the substrate and the rubber. Typically, temperatures between about 100degrees C. and about 300 degrees C. and heating times between about 1 minute and 30 minutes will be effective for this purpose, depending on the composition and characteristics of the rubber. Techniques such as compression molding, transfer molding or autoclave curing may be utilized to form the rubber-metallic substrate adhesive bond.

Any of the rubbers (elastomers) known in the art may be utilized in the composites of the present invention, such as, for example, natural rubber, nitrile rubber (acrylonitrile-butadiene copolymer rubber), polychloroprene, ethylene-propylene monomer (EPM), brominated butyl rubber, alkylated chlorosulfonated polyethylene, polybutadiene, neoprene, styrene-butadiene rubber, butyl rubber, ethylene-propylene diene monomer (EPDM), and the like.

Typically, the rubber will be vulcanizable rather than thermoplastic and will thus contain one or more of the curatives (sulfur, peroxide), accelerators, fillers, pigments, waxes, plasticizers, extenders, or the like known in the art.

In one embodiment of the invention, a thermosettable rubber formulation is injected or otherwise introduced into a mold having the desired configuration of the rubber substrate. A surface of a metallic article having an autodeposition coating deposited thereon is positioned so as to be exposed to the interior of said mold. For example, where an open-faced mold is employed, the coated metallic article may be used to close off the open mold face and held in place using clamps or other such means. The mold and coated metallic article are then heated at a temperature effective to cure the thermosettable rubber formulation which has been introduced, thereby forming both the rubber substrate and an adhesive bond between the autodeposition-coated metallic article and the rubber substrate.

EXAMPLE

An epoxy resin is prepared by combining bisphenol A (504 g), a low molecular weight diglycidyl ether of bisphenol A (DER 331, a product of Dow Chemical; 890 g), a flexibilizing epoxy resin (CARDOLITE NC-514, a product of the Cardolite Corporation; 305 g), and toluene (80 g) in a resin kettle and heating the mixture with stirring to 117° C. (243° F.). Triphenylphosphine catalyst (3.39 g) is then added. The reaction mixture is permitted to exotherm to a temperature of about 146° C. (295° F.); reaction is continued for 2 hours after the addition of the triphenylphosphine.

The reaction product is cooled to 117° C. (243° F.) and methyl isobutyl ketone (300 g) and toluene (100 g) added. The epoxy resin thereby obtained has a final weight per epoxide (epoxy equivalent weight) of about 1430 g/mole.

The epoxy resin is formulated into a dispersion suitable for use in an autodeposition bath composition as follows. A 24 weight % solution of HYPALON 30 chlorosulfonated polyethylene elastomer (237.95 g; a product of Dupont Elastomers); 212 g of the epoxy resin solution, 30 g VESTAGON B1530 epsilon-caprolactam blocked polyisocyanate (a product of Huels), 10.4 g TEXANOL coalescing agent (a product of Texaco Chemical) and 3.8 g MODAFLOW 2100 polyacrylate flow modifier (a product of Monsanto Chemicals) are dissolved in methyl isobutyl ketone (300 g) and toluene (100 g). The resulting organic solution is then added to 1500 g water containing 11.85 g RHODAPEX CO436 anionic surfactant (a product of Rhodia) or POLYSTEP B1 anionic surfactant (a product of Stepan) while stirring with a Jiffy blade to form a preemulsion. The preemulsion is passed through a particle size homogenizer to obtain a dispersion having an average particle size of about 340 nm. The solvent is then removed under vacuum using a rotary evaporator, providing an aqueous dispersion containing about 35 to about 40 weight percent solids The resulting dispersion is used to prepare an autodeposition bath composition as follows.

Deionized water (450 g per 1000 g of the final bath composition) is added to a container so as to fill approximately one-half of the container. AUTOPHORETIC 300 starter (available from Henkel Surface Technologies) is then added in an amount corresponding to 50 g per 1000 g of the final bath composition and mixed thoroughly. An amount of the dispersion obtained as described above sufficient to provide a solids level of 6% in the final bath composition is then added while mixing throughly, taking care not to generate foam. Finally, sufficient water is added to bring the volume of the bath composition up to the desired operating level.

A metal panel (e.g., cold rolled steel) is coated by placing said panel (which may desirably be pre-cleaned using standard cleaning methods known in the autodeposition art) in the autodeposition bath composition described above for about 60–90 seconds at a temperature of about 21 to 24 degrees C., after allowing the bath to equilibrate for 24 hours first. The redox value of the bath composition is maintained in the range of from 300 to 400 mV by addition of aqueous hydrogen peroxide or the like. Free fluoride ion activity is monitored using a LINEGUARD 101 meter and associated free fluoride sensitive electrode and maintained in the range of from 150 to 300 microamperes by addition of aqueous hydrofluoric acid or the like. Additional quantities of the dispersion obtained as described above are added as needed to maintain a solids level of 5.5 to 6.5%.

Following the coating step, the panel is passed through a tap water rinse tank for 60 seconds and then rinsed with a 1.5 weight % aqueous solution of calcium nitrate. The autodeposited coating on the metal panel is then substantially completely cured at 185° C. for 30 minutes to remove water and cross-link the epoxy resin. The thickness of the cured coating thereby obtained is approximately 20–25 microns.

The coated metal panel is brought into contact with a hot mold such that the surface of the coated metal panel blocks off the open face of the mold. The mold is then filled with a thermosettable nitrile rubber and the rubber cured for 120 seconds at a temperature of 193° C. The resulting rubber-metal composite is removed from the mold and allowed to cool to room temperature.

A strong bond is formed between the cured nitrile rubber and the coated metal panel, whereby the rubber cannot manually be pulled away from the coated metal panel.

What is claimed is:

1. A method of forming a rubber-metal composite comprising autodepositing a coating comprised of a resin reactive with an uncured thermosettable rubber formulation onto a metallic substrate surface, substantially completely curing said autodeposited coating, bringing the cured autodeposited coating into direct contact with the uncured thermosettable rubber formulation, and curing the thermosettable rubber formulation, said rubber-metal composite being characterized by the absence of a separate adhesive layer.

2. The method of claim 1 wherein the coating is comprised of epoxy resin comprising at least one diglycidyl ether of bisphenol A having an epoxide equivalent weight of about 150 to about 300 and at least one flexibilizing epoxy resin derived from cardanol, wherein the ratio of flexibilizing epoxy resin:bisphenol A diglycidyl ether is from about 0.05 to about 0.40, as calculated from the epoxide equivalent weight of each component.

3. The method of claim 1 wherein said autodepositing is accomplished by contacting the metallic substrate surface with an autodeposition bath composition comprising
   a) at least one epoxy resin;
   b) at least one accelerator; and
   c) at least one cross-linker.

4. The method of claim 3 wherein the autodeposition bath composition is additionally comprised of at least one coalescing agent.

5. The method of claim 3 wherein the autodeposition bath composition is additionally comprised of at least one flow control additive.

6. The method of claim 3 wherein the at least one epoxy resin comprises at least one glycidyl ether of a polyhydric phenol.

7. The method of claim 3 wherein the at least one epoxy resin comprises at least one diglycidyl ether of bisphenol A and at least one flexibilizing epoxy resin.

8. The method of claim 3 wherein the at least one accelerator is selected from the group consisting of acids, oxidizing agents and complexing agents which are capable of causing the dissolution of active metals from the metallic substrate surface.

9. The method of claim 3 wherein the at least one cross-linker comprises a molecule containing at least two blocked isocyanate groups.

10. The method of claim 3 wherein said at least one epoxy resin and said at least one cross-linker are present in emulsified form.

11. The method of claim 1 wherein said thermosettable rubber formulation is cured in a mold.

12. The method of claim 1 wherein said reactive-resin is selected from the group consisting of phenolic resins, phenolic novolak resins, and mixtures thereof.

13. The method of claim 1 wherein the coating is additionally comprised of at least one adhesion promoter.

14. The method of claim 1 wherein the coating is additionally comprised of at least one adhesion promoter selected from the group consisting of chlorinated rubbers and chlorinated polyolefins.

15. The method of claim 1 wherein the cured autodeposited coating has a thickness of from about 20 to about 25 microns.

16. The method of claim 1 wherein the thermosettable rubber composition is comprised of at least one rubber selected from the group consisting of natural rubber, nitrile rubber, alkylated chlorosulfonated polyethylene, polybutadiene, neoprene, styrenebutadiene rubber, butyl rubber and ethylene-propylene-diene monomer (EPDM).

17. A method of forming a rubber-metal composite comprising autodepositing a coating comprised of a reactive resin directly onto a metallic substrate surface, said resin comprising functional groups reactive with functional groups of an uncured thermosettable rubber formulation, substantially completely curing said autodeposited coating, bringing the cured autodeposited coating into direct contact with said uncured thermosettable rubber formulation, and curing the uncured thermosettable rubber formulation, said rubber-metal composite being characterized by the absence of: a separate adhesive layer and a phosphate layer.

18. A method of forming a rubber-metal composite comprising:
   a) autodepositing a coating comprised of a resin reactive with a thermosettable rubber formulation onto a metallic substrate surface, said resin being selected from the group consisting of phenolic resins, phenolic novolak resins, styrene/butadiene-copolymers, polyacrylates, acrylic co-polymers, polyvinyl chloride, vinyl chloride/vinylidene chloride-copolymers and mixtures of phenolic resins and phenolic novolak resins;
   b) substantially completely curing said autodeposited coating,
   c) bringing the cured autodeposited coating into direct contact with the thermosettable rubber formulation, and
   d) curing the thermosettable rubber formulation, said rubber-metal composite being characterized by the absence of a separate adhesive layer.

* * * * *